United States Patent [19]
Riches

[11] Patent Number: 6,157,409
[45] Date of Patent: Dec. 5, 2000

[54] APPARATUS AND METHOD FOR HIGH SPEED IMAGING

[75] Inventor: Mark John Riches, Basildon, United Kingdom

[73] Assignee: Imco Electro-Optics Limited, United Kingdom

[21] Appl. No.: 09/407,515

[22] Filed: Sep. 28, 1999

Related U.S. Application Data

[63] Continuation of application No. 08/525,916, Sep. 7, 1995, abandoned.

[30] Foreign Application Priority Data

Sep. 7, 1994 [EP] European Pat. Off. .............. 94306563

[51] Int. Cl.$^7$ .................................................. H04N 5/235
[52] U.S. Cl. ........................... 348/362; 348/207; 348/159
[58] Field of Search .................................. 348/36, 38, 39, 348/61, 86, 92, 125, 131, 132, 143, 153, 157, 159, 207, 296, 294, 362, 364, 311, 312, 314, 241, 248; H04N 5/235

[56] References Cited

U.S. PATENT DOCUMENTS

| | | |
|---|---|---|
| 3,449,758 | 6/1969 | Lavine . |
| 3,682,064 | 8/1972 | Matsunaga et al. . |
| 5,025,319 | 6/1991 | Mutoh et al. . |
| 5,598,208 | 1/1997 | McClintock . |

FOREIGN PATENT DOCUMENTS 0 474 483 A2  3/1992  European Pat. Off. .

OTHER PUBLICATIONS

Patent Abstracts of Japan, vol. 11, No. 88, (E490), Mar. 18, 1987 & JP-A-61 239784 (Mitsubishi Electric Corp.) (abstract).

Optical Engineering, vol. 31, No. 6, Jun. 1992, Bellingham, US pp. 1369–1374, XP 000278272, R.G. Racca et al.

An Electronic Cranz–Schardin Camera, Rev. Sci. Instruments 62(2), Feb. 1991, pp. 364–368.

*Primary Examiner*—Tuan Ho
*Attorney, Agent, or Firm*—Cesari and McKenna, LLP

[57] ABSTRACT

A high speed imaging apparatus for high speed imaging in two dimensions is described. The apparatus comprises a plurality of image storing devices 1 to 8 arranged for receiving and storing images in two dimensions, exposure means for exposing respective ones of the devices to respective images of a sequence of images received by the apparatus, erasure means for erasing any previously stored image in the device to be exposed prior to exposure, read means for reading images stored in said devices, and stop means for stopping the exposure of said devices and the erasure of previously stored images when the apparatus receives a trigger signal representing occurrence of an event. This enables at least one image received by the apparatus before receipt of the trigger signal to be read from the apparatus after receipt thereof. The apparatus therefore provides for recordal, and subsequent retrieval of image information relating to an event received prior to detection of the event.

14 Claims, 3 Drawing Sheets

Ti = interframe period
Ts = shutter period
Te = erasure period

APPARATUS AND METHOD FOR HIGH SPEED IMAGING

RELATED APPLICATION

This application is a continuation of Ser. No. 08/525,916, filed Sep. 7, 1995, now abandonned;

This invention relates to an apparatus and method for high speed imaging in two dimensions. The invention may be applied to framing cameras for permitting photography of high or ultra high speed events which typically occur over time scales in the order of nanoseconds to milliseconds.

Various types of framing cameras are known in the art with speeds of 2000 to 100,000,000 frames per second. Framing cameras of this type are used for taking pictures of high or ultra high speed events such as lightening and sparks resulting from electrical discharge, or events to be analyzed to a high resolution such as in shock waves, fluid dynamics and fuel injection. An image tube of the type described in EP patent specification 0 315 435 can be used in such a framing camera for recording these high speed events. Generally speaking, the duration of the event which can be recorded by the image tube is inversely proportional to the number of frames per second. Consequently, the greater the resolution required of the event being recorded, the smaller the running time of the image tube. In these circumstances, it is necessary to predict the precise timing of the event so the image tube can be triggered to record the event as it occurs.

In practice, the precise timing of events and physical phenomena to be recorded and analyzed is often unpredictable. For example, it may be desired to record the early stages of electrical breakdown which occur in lightening and subsequently study the characteristics of this. As the timing of the lightening cannot be predicted, by the time the main lightening strike is detected and the image tube triggered, the discharge events immediately preceding the main strike have been missed. A similar situation occurs in the study of plasma streamers prior to breakdown. It is only usually at breakdown itself that the image tube is triggered and so the pre-breakdown stage is missed.

A previously proposed method of overcoming this problem is to use a film or video camera. The camera is triggered to start before the event is expected and is stopped once the event has occurred—it is no problem to detect the main event and so stop the camera then. However to do this usually necessitates running the camera for several seconds and so this method has the disadvantage that to be sure of capturing the event, a large amount of film or video for analysis is used. This is particularly burdensome when it is considered that in many cases, the critical part of the event to be recorded only lasts for a few frames. Another problem with these systems is that generally the video and film systems can only operate at about 100,000 frames per second or less which severely compromises the temporal resolution of the recorded event. The frame rate is limited by the film or tape transport speed. If CCD cameras are used, the frame rate is usually limited by the readout rate.

It is an aim of the present invention to provide an apparatus and method which provides for recordal and subsequent retrieval of image information relating to an event received prior to detection of the event.

It is another aim of the invention to provide an apparatus for high speed imaging in two dimensions which can be used as a high speed framing camera for recording an unpredictable event of short duration at high temporal resolution. It is also an aim of the invention to provide a method for high speed imaging in two dimensions for recording an unpredictable event of short duration at high resolution.

According to the present invention, there is provided a high speed imaging apparatus for high speed imaging in two dimensions, comprising a plurality of image storing devices arranged for receiving and storing images in two dimensions, exposure means for exposing respective ones of the devices to respective images of a sequence of images received by the apparatus, erasure means for erasing any previously stored image in the device to be exposed prior to re-exposure, read means for reading images stored in said devices, and stop means for stopping the exposure of said devices and the erasure of previously stored images when the apparatus receives a trigger signal representing occurrence of an event, whereby at least one image received by the apparatus before receipt of the trigger signal can be read from the apparatus after receipt thereof.

The erasure means may be operative for erasing the previously stored image immediately prior to exposure of the device to be exposed so that only one of the devices has no stored image at a time. Alternatively, the apparatus may include means for erasing two or more devices ahead of the one being exposed so that image information received by the device after as well as before the trigger signal can be recorded and subsequently read from the apparatus. In this case, an apparatus having N devices (where N is more than two) up to N minus M (where M is 1 to N) of these may have no stored image at any given time so that at the time of receipt of the trigger signal, N minus M devices are available to store up to the next N minus M images following the trigger signal and M device(s) contain(s) an image received by the apparatus before the trigger signal. In this case, the apparatus can be run faster after receipt of the trigger signal as the erase time is no longer a limiting factor. An apparatus in which N/2 of the devices have no stored image on receipt of the trigger signal and N/2 devices have stored images before receipt of the trigger signal provides for the storage of the same number of images either side of the trigger signal.

Each device has a finite erase period. Consequently, commencement of erasure of an image stored in a device must begin at least one erase period prior to exposure. The exposure time of the devices may be typically variable from about a few nanoseconds upwards and the time interval between the completion of exposure of one of the devices and commencement of exposure of the next device may also be varied from zero upwards. The exposure and interframe times may be the same prior to receipt of the trigger signal. However, the exposure time might be much shorter, for example, of the order of 100 ns (exposure) to 900 ns (interframe period). One possible application for this 1:9 ratio might be when it is desired to capture high speed events.

The image storing devices may be semiconductor devices, for example, charged-coupled devices (CCD's). In embodiments of the invention, the number of devices may be between four and eight but a number outside that range might be adopted depending of the application of the apparatus. In a preferred arrangement, eight devices are used (N=8). Each one of the devices may be provided with an image intensifier. The N devices are exposed in sequence 1, 2, 3 ... 7, 8. At the end of the sequence, the exposure cycle can begin again as the first device of the sequence will be erased.

Although the time taken to read out CCD's is too slow (at high framing speed) to allow stored images to be read out in real time, this is not a factor which limits the operation speed. This is because CCD's can be erased or wiped clean in a fraction of the time (in the order of a microsecond) it takes to read information from them. The stored images do not need to be read out until after receipt of the trigger signal. An anti-blooming gate, conventionally used to stop glare and saturation in solid state imaging devices by leaking away excessive charge, may be used to erase the image stored in the devices. Alternatively, other methods may be employed in CCD's to destroy the stored charge packets in their potential wells such as altering the substrate potential.

According to the present invention, there is also provided an apparatus for high speed imaging in two dimensions, comprising a plurality of image storing devices arranged for receiving and storing images in two dimensions, exposure means for exposing respective ones of the devices to respective images of a sequence of images received by the apparatus, updating or substituting means for updating or substituting respective previously stored images in the devices by the step of exposing, means for receiving a trigger signal indicative of detection of an event, means for stopping the exposure of the devices and the updating or substituting in response to receipt of the trigger signal, and means for reading stored images from the devices exposed at least before receipt of the trigger signal whereby at least one image received by the apparatus before receipt of the trigger signal can be read from the apparatus after receipt of the trigger signal.

According to the present invention, there is further provided a method of high speed imaging in two dimensions, comprising receiving and storing images in two dimensions in a plurality of image storing devices, exposing respective ones of the devices to respective images of a sequence of images received by the apparatus, updating or substituting respective previously stored images in the devices by the step of exposing, receiving a trigger signal indicative of detection of an event, stopping the exposure of the devices and the updating or substituting in response to receipt of the trigger signal, and reading stored images from the devices exposed at least before receipt of the trigger signal whereby at least one image received by the apparatus before receipt of the trigger signal can be read from the apparatus after receipt of the trigger signal.

The step of updating or substituting may be performed by overwriting the previously stored image with the new image. This might be affected if the detected event were self-luminous wherein at times before the event itself there is in effect no light to be recorded, hence the image storing device will be updating an effective zero level hence no erase cycle is required beyond system initialisation. In other words, the previously stored image is overwritten with the new brighter image. This avoids any need to bring the image storing device to an empty state by reading out the device or otherwise erasing it prior to exposure. Alternatively, this step may be performed by erasing the previously stored image prior to exposure.

Embodiments of the method may include erasing the devices immediately prior to exposure so that only one device has no stored image at a time. Alternatively, two or more devices may be erased ahead of the one being exposed so that image information received by the device after as well as before the trigger signal can be recorded and subsequently read from the apparatus.

Embodiments of the invention have the advantage that they permit recording and subsequent readout of an event which took place at a point in time which precedes detection of the event. This permits an unpredictably occurring event to be captured at high temporal resolution.

The invention will now be further described by way of example with reference to the accompanying drawings in which.

Figure 1:
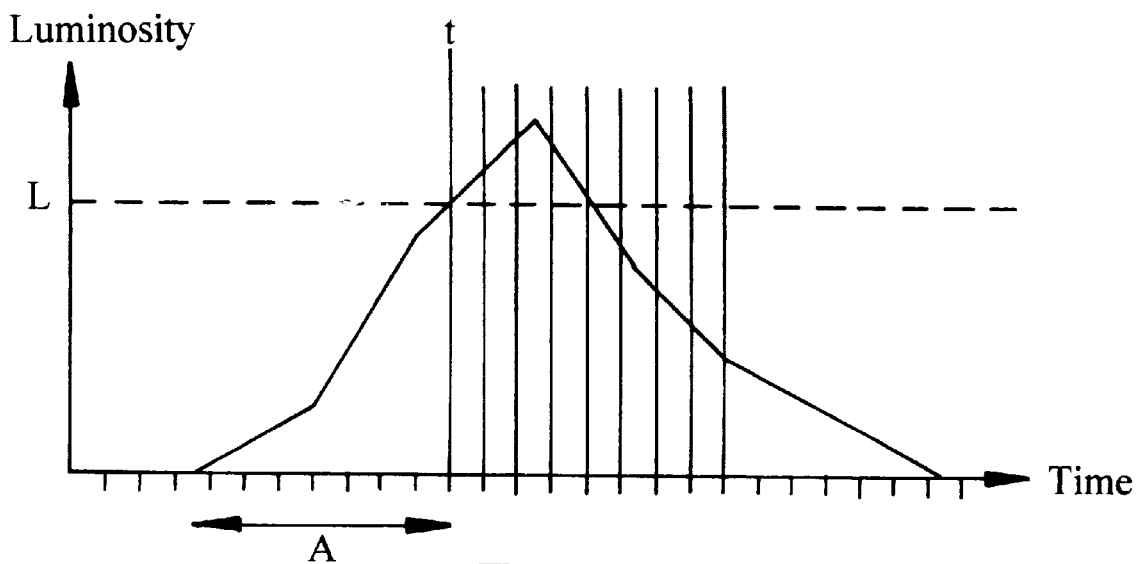
FIG. 1 is a graph representing the timing of recording relative to the timing of an event in a prior art apparatus.

FIG. 1 is a graph showing the luminosity of an event against time relative to the trigger pulse of a prior art image recording apparatus. Once the luminosity has reached an intensity L, the presence of the event is detectable and a trigger signal "t" can be generated to start the image recording apparatus. The trigger pulse "t" is followed by a series of pulses which represent the exposure of successive cameras or image storing devices. As can be seen from FIG. 1, the series of pulses, in this case 8, show that the part of the event recorded is that following the trigger pulse "t". Consequently, the beginning part of the event which has a luminosity less than L, illustrated by region A in FIG. 1, is not captured by the image recording apparatus.

Figure 2:
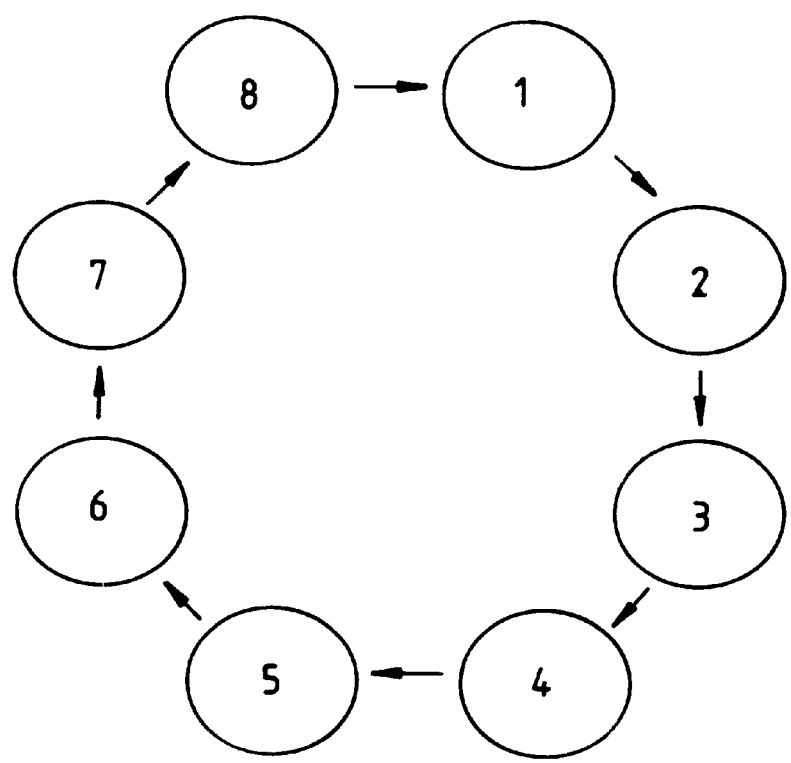
FIG. 2 is a schematic diagram of an embodiment of the invention having eight image storing devices.

FIG. 2 schematically represents eight image storing devices which, in this example, are CCD cameras arranged in a circle. Naturally, the precise configuration can be varied as desired. What is important is that the electronics knows the sequence of exposures so that the recorded images can be studied in the sequence in which they occurred in time. The optical path of each image frame is directed onto successive ones of the eight CCD cameras. This may be implemented by way of a static beam splitter with each CCD having a shuttering mechanism. Alternatively, the implementation may be by way of a rotating prism or drum camera. The arrows of FIG. 1 indicate the direction of frame rotation.

Figure 3:
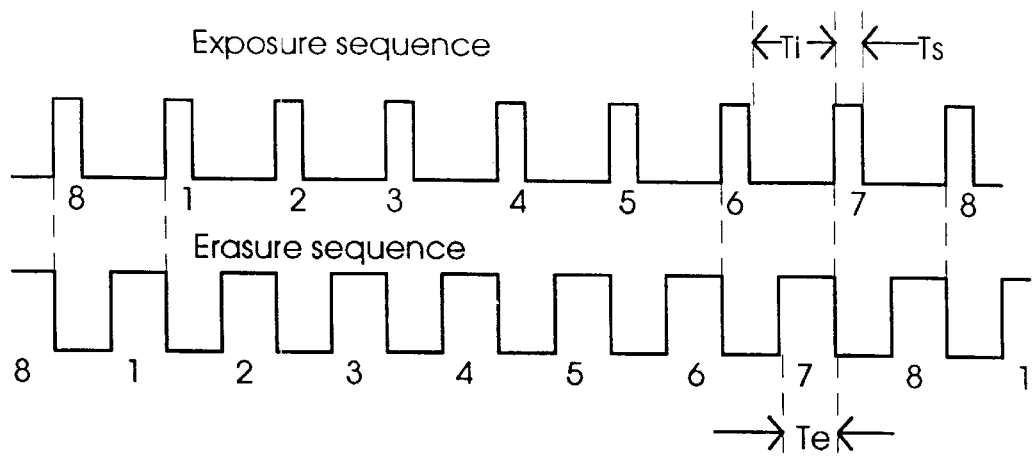
FIG. 3 is a pulse diagram showing exposure and erasure sequences in the embodiment of FIG. 2.

FIG. 3 is a pulse timing diagram showing the exposure and erasure sequences for the eight cameras of FIG. 2. In this example, the cameras are exposed in the sequence . . . 7, 8, 1,2, . . . 5, 6 . . . . The erasure means is operative for erasing the image stored in the camera which is to be exposed next but the precise start time of erasure can vary provided it is completed before exposure begins. In the example of FIG. 3, the erasure begins after exposure of the preceding camera is complete and ends just as the exposure begins. Only one of the devices has no stored image at any one time. For example, between the exposures of cameras 8 and 1, camera 1 is erased. Ti represents the interframe period, Ts the exposure period and Te the erasure period. The limitation on the framing speed of this embodiment is determined by the minimum time it takes to erase the next camera to be exposed.

If this is implemented by way of a beam splitter and each CCD has an independent image intensifier acting as its shutter, then a fast decay output phosphor may be utilised in order to ensure that the phosphor had decayed sufficiently before re-exposure. For example, in an eight frame system running at 1,000,000 frames per second, 7 to 8 $\mu$s is available for the phosphor to decay. Gated image intensifiers (with fast phosphors) are not necessarily required if a rotating mirror system is provided because the optical rotation itself will expose each CCD in turn. A separate shuttering mechanism gives the ability to have shorter exposure.

Figure 4:
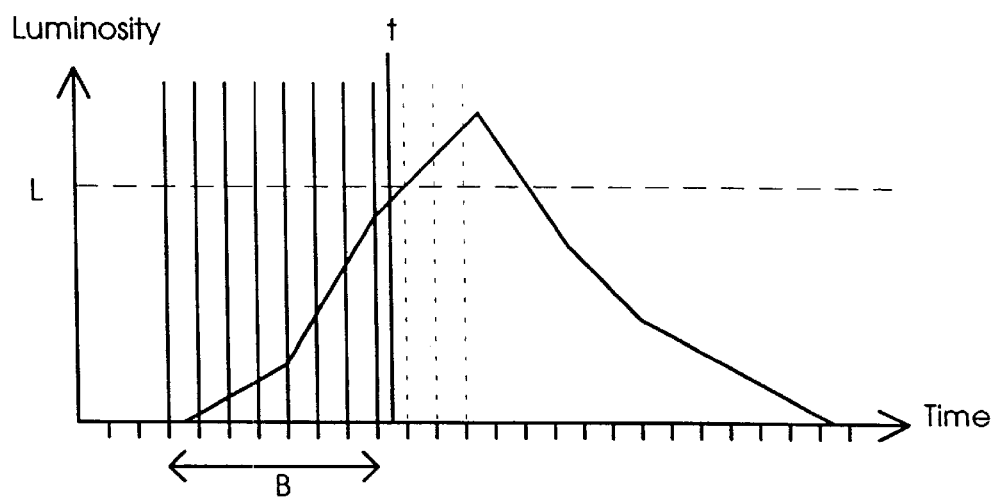
FIG. 4 is a graph representing the timing of recording relative to the timing of an event in the embodiment of FIGS. 2 and 3.

It can be seen from FIG. 4 that when the electronics senses the presence of the event, i.e. when the luminosity reaches "L", the trigger signal to stops the exposure and the erasure means. The electronics may be operative to delay the actual stopping of the exposure means until completion of the current exposure but before erasure of the next CCD camera which would have been erased had the camera been left running. At this time, the camera has stored the eight previous frames as illustrated by the area B in FIG. 4. These images can be read out of the cameras as and when desired after the apparatus is stopped. It is in this way that embodiments of the invention are operative to record and allow subsequent readout of an event which took place before detection of the event itself. The cameras may be read out slowly in order to maintain or maximize signal to noise (dynamic range) ratio.

Figure 5:
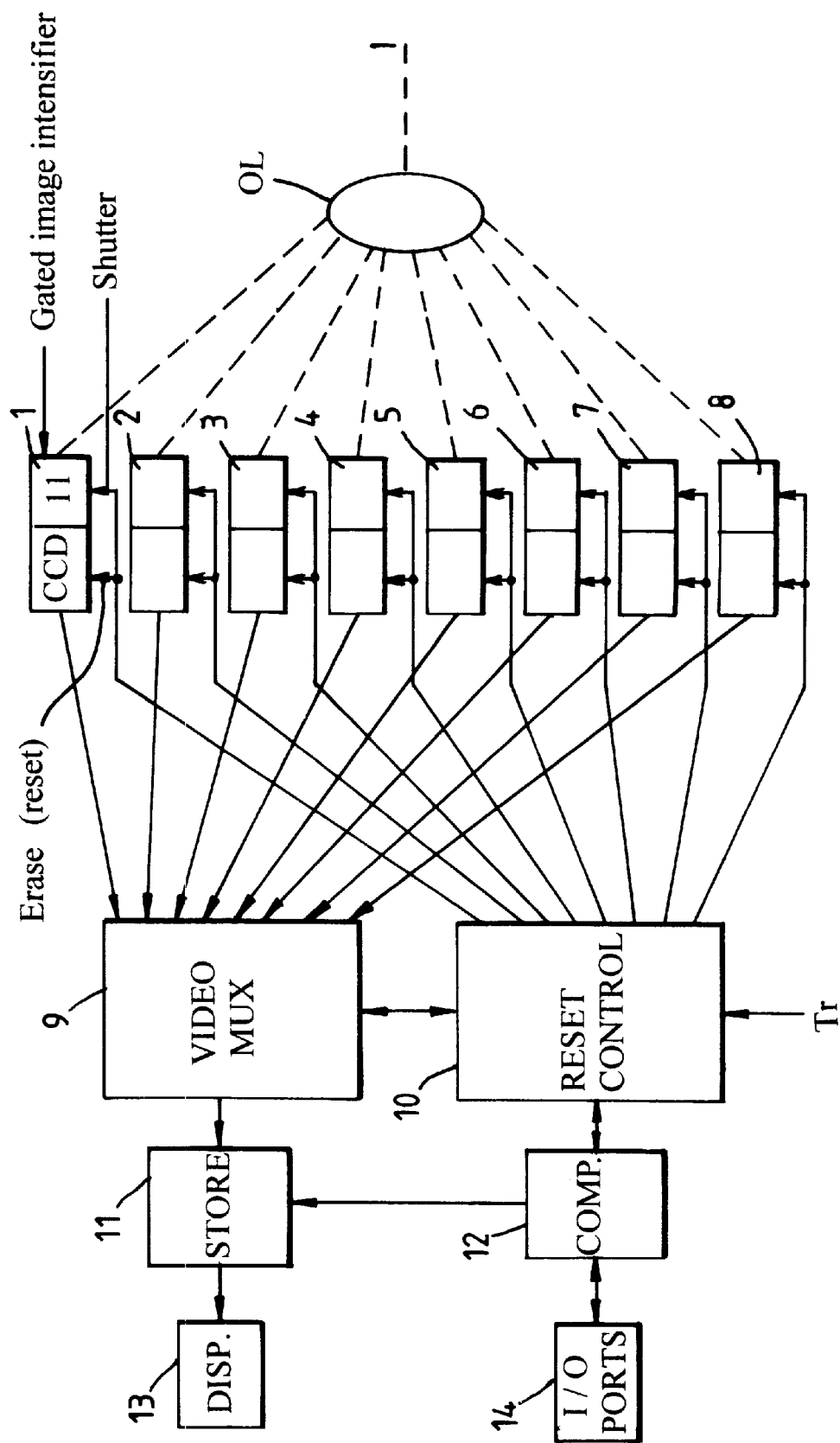
FIG. 5 is a schematic diagram of an apparatus embodying the invention.

FIG. 5 is a schematic drawing showing the main elements of an embodiment of the invention. Numerals 1 to 8 represent eight video cameras each of which include a gated image intensifier (II) optically coupled to an erasable (resettable) CCD sensor. Existing beam-splitter cameras utilizing eight CCD's include the Hadland Photonics camera (model 468) or the Cordin camera (model 288). The Hadland Photonics camera would be suitable for use in this embodiment. The resulting CCD camera is shuttered by the image intensifier for predetermined interframe and exposure periods. An image signal I incident on an objective lens OL is split into eight components respectively directed to the video cameras.

The embodiment comprises electronics as follows. A video multiplexer 9 reads out the selected CCD camera(s) at predetermined times and exports the received image data into an image (frame) store 11. The image store 11 may be in the form of a conventional digital memory area where the images received from the individual CCD cameras via the video multiplexer 9 are stored prior to display on a display 13.

A shutter timing, channel sequencer and CCD Erasure (reset) Control 10 is provided for controlling the timings within the camera. This controls the individual CCD channel exposures, timing, erasure, sequencing of channels and following receipt of a trigger signal Tr (indicative of the detection of an event to be studied), the read-out of the individual CCD cameras via the video multiplexer 9. A microcomputer 12 controls the running of the camera, for example, the number of frames for which the camera continues to run after receipt of the trigger signal Tr, and the control of input and output ports 14.

In operation, the user determines the configuration of the system (i.e. exposure times, interframe periods, number of pre/post triggered frames) for the desired application by keying in control information via the input and output ports 14. The microcomputer 12 in turn adjusts the erase timing and the gating (exposure) period of each CCD camera/intensifier 1 to 8 to achieve the required configuration. The cameras will then run in sequence as described above, exposing, erasing each CCD just prior to re-exposure and then re-exposing each CCD in turn. Upon receipt of the trigger signal Tr, the running cycle or sequence will terminate (either immediately or after a predetermined number of further frames) to turn off all of the CCD's. Each CCD will contain an image, some of which will have been captured by the apparatus before receipt of the trigger signal Tr. Every CCD is then read out via the multiplexer 9 into the frame store 11 from which it may be viewed on the display 13 and analyzed.

Variations of the embodiment will be apparent to a man skilled in the art without departing from the scope of the invention as defined by the claims. For example, instead of erasing only the camera immediately ahead of the one being exposed, two or more cameras may be erased either simultaneously or by arranging the erasure means to be two or more steps ahead of exposure at any and given point in time. If this alternative is adopted, it is possible to keep the apparatus running for a time period following the trigger signal "t" (FIG. 4) that corresponds to the number of cameras which have been erased. In other words, if at the time of receipt of the trigger signal "t", there are three erased cameras, then the apparatus can be kept running for three subsequent exposure periods. The earliest three of the eight frames illustrated in the region B of FIG. 4 therefore record the first three frames to the right of the trigger pulse (represented by dotted lines) instead of the three leftmost frames of region B. The apparatus can therefore be arranged to record the event on either side or both sides of trigger signal.

The apparatus embodying the invention has been described on the basis that the image storing device to be exposed is erased prior to exposure. It is possible to implement the invention without erasing or bringing the storing device to an empty state before exposure if the image storing device can be overwritten so as to be updated to store the new image.

Other variations are possible without departing from the scope of the claimed invention. For example, the image storing devices may be responsive to forms of electromagnetic radiation other than visible light. Instead of dividing the input image into the required number of parallel channels via a conventional optical beam splitter/s, the optical path may be rotated exposing each CCD in turn. Each separate channel may then be input into a separate CCD via a shuttering mechanism. The shutters are timed such that each CCD is again exposed in turn as in the continuous loop. As before, erasure takes place just prior to re-exposure. Shuttering may be mechanical, LCD, electro-optical, solid-state (as part of the CCD chip itself), gated image intensifiers, or via the rotating optical beam itself sweeping each CCD in turn. With the gated image intensifier solution, a suitable phosphor must be chosen for the output decay to be compatible with the framing speed.

What is claimed is:

1. A high speed imaging apparatus for high speed imaging in two dimensions of the occurrence of an event, comprising a plurality of image storing devices arranged for receiving and storing images in two dimensions, exposure means for exposing, in a repeating sequence commencing before the occurrence of the event, respective ones of the devices to respective images of a sequence of images received by the apparatus, erasure means for erasing any previously stored image in each device to be exposed prior to re-exposure, read means for reading images stored in said devices, and stop means for stopping the exposure of said devices and the erasure of previously stored images when the apparatus receives a trigger signal representing the occurrence of the event whereby at least one image received by the apparatus before receipt of the trigger signal can be read from the apparatus after receipt thereof.

2. A high speed imaging apparatus according to claim 1, wherein the erasure means is operative for erasing the previously stored image immediately prior to exposure of the device to be exposed so that only one of the devices has no stored image at a time.

3. A high speed imaging apparatus according to claim 1, wherein the apparatus includes means for erasing two or more devices ahead of the one being exposed so that image information received by the device after as well as before the trigger signal can be recorded and subsequently read from the apparatus.

4. A high speed imaging apparatus according to claim 3, wherein the apparatus has N (where N is more than two) devices, up to N minus M (where M is 1 to N) of these having no stored image at any given time so that at the time of receipt of the trigger signal, N minus M devices are available to store up to the next N minus M images following the trigger signal and M device(s) contain(s) an image received by the apparatus before the trigger signal.

5. Apparatus according to claim 1, wherein each of the image storing devices is re-exposed by the exposure means after an interval less the than fastest read time per device.

6. An apparatus for high speed imaging in two dimensions of an event, comprising a plurality of image storing devices arranged for receiving and storing images in two dimensions, exposure means for exposing respective ones of the devices to respective images of a sequence of images received by the apparatus before the event, updating or substituting means for updating or substituting, in a continuously repeating sequence, respective previously stored images in the devices by the step of exposing, means for receiving a trigger signal indicative of detection of the event, means for stopping the exposure of the devices and the updating or substituting in response to receipt of the trigger signal, and means for reading stored images from the devices exposed at least before receipt of the trigger signal whereby at least one image received by the apparatus before receipt of the trigger signal can be read from the apparatus after receipt of the trigger signal.

7. A high speed apparatus according to any one of claims 2 to 6 and 5, wherein the image storing devices are semiconductor devices.

8. A high speed imaging apparatus according to any one of claims 1 to 6 and 5, wherein the erasure means includes an anti-blooming gate.

9. A method of high speed imaging in two dimension, comprising receiving and storing images in two dimensions of an event in a plurality of image storing devices, exposing respective ones of the devices to respective images of a sequence of images received by the apparatus commencing before the event, updating or substituting, in a continuously repeating sequence, respective previously stored images in the devices by the step of exposing, receiving a trigger signal indicative of detection of the event, stopping the exposure of the devices and the updating or substituting in response to receipt of the trigger signal, and reading stored images from the devices exposed at least before receipt of the trigger signal whereby at least one image received by the apparatus before receipt of the trigger signal can be read from the apparatus after receipt of the trigger signal.

10. A method according to claim 9, wherein the step of updating or substituting is performed by overwriting the previously stored image with the new image.

11. A method according to claim 9, wherein the step of updating or substituting is performed by erasing the previously stored image prior to exposure.

12. A method according to claim 11, including erasing the devices immediately prior to exposure so that only one device has no stored image at a time.

13. A method according to claim 11, including erasing two or more devices ahead of the one being exposed so that image information received by the device after as well as before the trigger signal can be recorded and subsequently read from the apparatus.

14. A method according to claim 9, wherein each of the image storing devices is re-exposed by the exposure means after an internal less than the fastest read time per device.

* * * * *